H. B. STELLING.
TRAP.
APPLICATION FILED JAN. 17, 1913.

1,117,104.

Patented Nov. 10, 1914.
2 SHEETS—SHEET 1.

Inventor
Henry B. Stelling

Witnesses
J. T. L. Wright

By Victor J. Evans,
Attorney

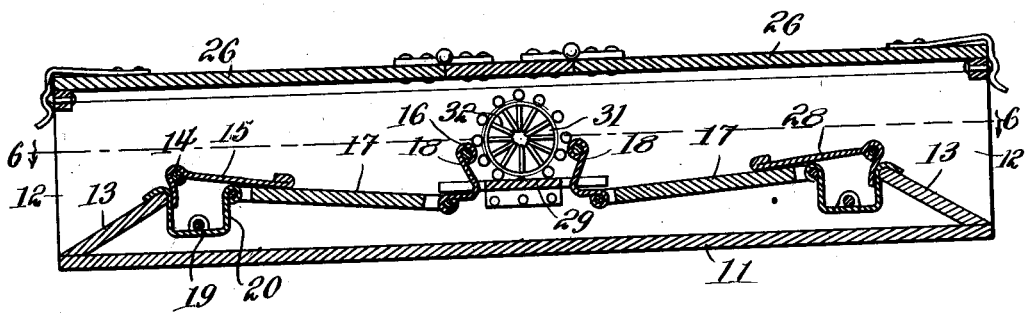
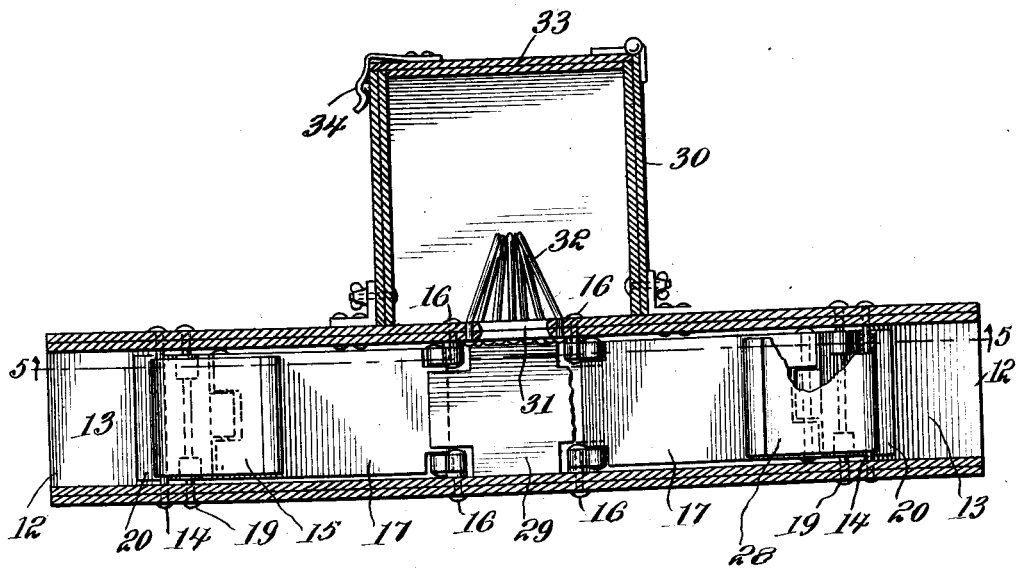

UNITED STATES PATENT OFFICE.

HENRY B. STELLING, OF AUGUSTA, GEORGIA.

TRAP.

1,117,104.     Specification of Letters Patent.     Patented Nov. 10, 1914.

Application filed January 17, 1913. Serial No. 742,644.

*To all whom it may concern:*

Be it known that I, HENRY B. STELLING, a citizen of the United States, residing at Augusta, in the county of Richmond and State of Georgia, have invented new and useful Improvements in Traps, of which the following is a specification.

An object of the invention is to provide a trap.

A further object of the invention is the provision of a device which can be conveniently used as a trap for catching rabbits, rats or other rodents and which can also be employed in connection with poultry as a trap nest and in which, when a hen enters the trap, the same will close to prevent the entrance of other chickens while the hen is setting.

Figure 1:
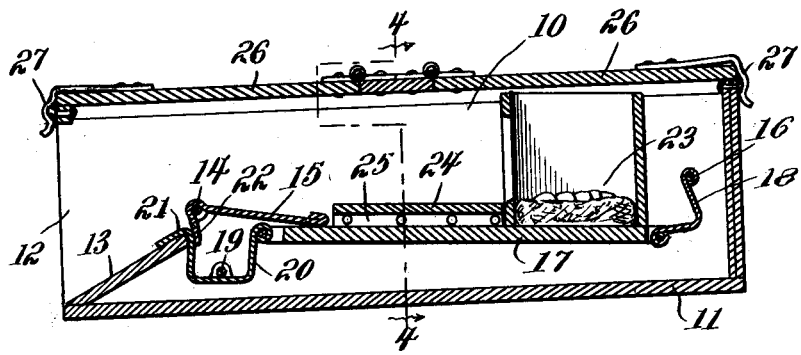
Figure 2:
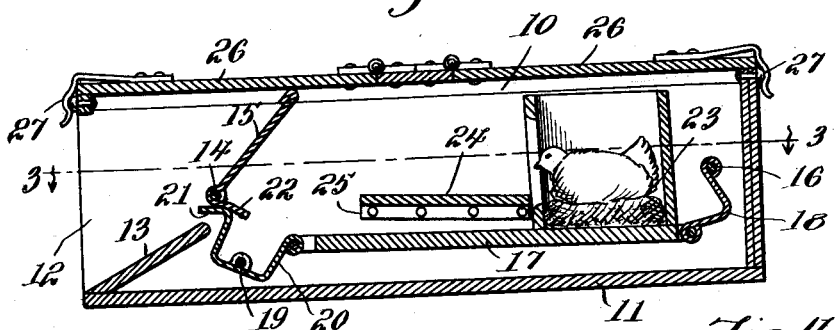
Figure 3:
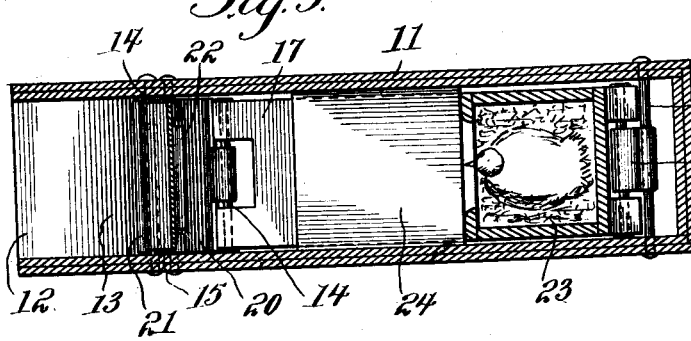
Figure 4:
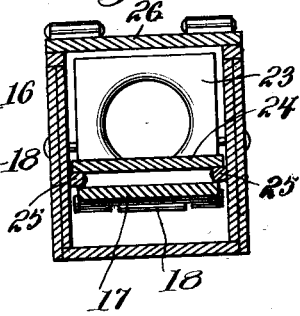

In the further disclosure of the invention reference is to be had to the accompanying drawings, constituting a part of this specification, in which similar characters of reference denote corresponding parts in all the views, and in which:

Figure 1 is a vertical longitudinal sectional view of the device showing the same in normal and open position; Fig. 2 is a similar view showing the device in closed position; Fig. 3 is a horizontal sectional view taken on the line 3—3 in Fig. 2; Fig. 4 is a vertical transverse sectional view taken on the line 4—4 in Fig. 1; Fig. 5 is a vertical longitudinal sectional view of a modified form of the trap; and Fig. 6 is a horizontal sectional view taken on the line 6—6 in Fig. 5.

Referring more particularly to the first four figures, I provide a trap 10 which is disclosed in the above figures as to be used, preferably, as a trap nest and which includes a longitudinal casing 11 having an entrance 12 by providing one end of the casing open, the other end of the casing being preferably closed as shown. An inclined board 13 is secured rigidly in the casing 11 at the entrance 12 and mounted to swing on a horizontally arranged shaft 14, extending transversely in the casing 11, is a closure 15, the said closure, when in lowered position, being adapted to extend horizontally and form a continuation of the board 13, but when in raised position adapted to close the casing 11 as shown.

A horizontal shaft 16 extends transversely to the casing 11 in the other end thereof and mounted to swing on the said shaft is an actuating member 17, the said actuating member having connection with the shaft by means of a strap 18 mounted to swing on the shaft 16 and having pivotal connection with the actuating member which extends longitudinally in the bottom of the casing 11 and terminates adjacent the closure 15. A third shaft 19 extends transversely in the bottom of the casing 11, beneath the closure 15, and mounted to swing on the said shaft is a U-shaped member 20 having pivotal connection with an end of the actuating member 17 and provided with a lateral flange 21 adapted to engage a depending flange 22 formed with the closure 15, thus swinging the closure into closed position when a downward pressure is exerted on the actuating member 17. A nest 23 is supported on the actuating member 17 and a platform 24 is supported within the casing 11 on suitable supporting strips 25 secured to the side walls of the casing, the said platform being spaced from the actuating member 17 and lying above the same, it being further seen that the platform is interposed between the closure 15 and the nest 23 and, therefore, covers a portion of the actuating member 17. A plurality of doors 26 are mounted to swing on the casing 11 and form the top of the said casing, the said doors being normally held in closed position by suitable catches 27 as shown.

Now in the use of the device as a trap nest, the hen enters the casing 11 through the entrance 12 by walking up the inclined board 13 and then stepping on to and passing over the closure 15 which is in lowered position. The hen then steps on to the rigid platform 24 and proceeding along the platform steps into the nest 23. Now it will be apparent that at the moment the weight of the hen is received on the nest, the actuating member 17, due to the said weight, will swing downwardly, thus through the medium of the U-shaped member 20 operating the closure 15 and swinging the same upwardly into position to close the casing 11, thus preventing other poultry from entering the casing while the hen is setting. At the moment the hen steps out of the nest and on to the platform 24, the actuating member 17, mounted to swing as shown, will return to normal position, thus causing the closure 15 to gravitate into open position so that the hen can step on to the closure and thence on to the board 13 and pass out of the casing.

In Figs. 5 and 6 I disclose a modified form of my device and in which the structure disclosed is used as a trap for catching rabbits, rats or other rodents. Referring to Figs. 5 and 6, it will be seen that in place of the nest 23 I employ another closure 28, similar in every respect to the closure 15, and operable simultaneously therewith by the action of the actuating member 17, it being understood that the casing in the present instance is open at both ends. Furthermore, in place of the longitudinal platform 24 I provide a smaller rigid platform 29, and it will now be apparent that when the device is in normal position both the closures 15 and 28 will be in open position in order that an animal can pass into the casing. Now when the animal passes into the casing, it must pass over the closure 15 and then upon the actuated member 17, the instant the weight of the animal is received upon the actuating member the closure 15 will swing downwardly, thus closing the opening in that end of the trap. The same is true with the other end of the trap for as soon as the animal passes over the closure 28 to the member 17 the closure 28 will be swung upwardly to close that respective end of the trap. It will, therefore, be apparent from the views that when the animal stands on the platform 29 both closures will return to open position but at the moment the animal again steps on to the actuating member 17 either of the closures 15 or 28 will be operated to close the ends of the casing and the animal, therefore, will be trapped and unable to get out of the casing through the ends thereof.

Now in order to further secure the animal, I provide an auxiliary casing 30 having connection with the main casing 11, an opening 31 being provided from the main casing 11 to the auxiliary casing 30, immediately adjacent to the platform 29. It will be further seen that a frusto-conical frame 32 of any desired construction is secured in the opening 31 so that the animal can pass through the frame into the auxiliary casing 30 from the platform 29, the restricted end of the frame, however, providing an opening so small that when the animal once passes from the main casing into the auxiliary casing it will be unable to return to the main casing and, therefore, the trap included in the main casing will be in condition to receive another animal, the closures thereof being normally in open position. In order that the animal which is caught in the auxiliary casing may be readily removed therefrom, I provide a closure 33 mounted to swing on the casing and normally secured by suitable catches 34, it being thus seen that the animal trapped in the auxiliary casing can be taken therefrom without in any manner disturbing the structure carried within the casing 11.

From the foregoing description it will, therefore, be seen that the device described can be employed as a trap nest in connection with poultry or can be used as an ordinary trap for catching rats, rabbits or other rodents, it being only necessary in the second instance to provide a plurality of closures and have both ends of the casing normally open, whereas in the trap nest only one end of the casing is open and only a single closure is, therefore, employed.

Having thus described my invention, I claim:

In a trap, the combination with a casing open at one end thereof, of an inclined run located adjacent the said end of the casing, a U-shaped member pivoted at its central portion to swing on the casing within the same, with one end of the said member normally engaging the said inclined run, a strap mounted to swing on the casing, a board having pivotal connection with the strap and pivotal connection with the said U-shaped member so that the board will be held suspended by the said strap and said U-shaped member, and a closure mounted to swing in the casing and normally constituting a gangway from the run to the said board, with the said closure having engagement with the U-shaped member whereby the closure will be swung into position to close the casing when a weight is placed on the board sufficient to cause the same to swing downwardly and rearwardly and actuate the said U-shaped member.

In testimony whereof I affix my signature in presence of two witnesses.

HENRY B. STELLING.

Witnesses:
 E. REYNOLDS,
 GEORGE HAINS.